United States Patent [19]

Olsson

[11] 4,353,494
[45] Oct. 12, 1982

[54] PROCESS AND APPARATUS FOR THE MANUFACTURE OF ANNULAR WORK PIECES FOR SUBSEQUENT CONVERSION INTO FINISHED PRODUCTS

[76] Inventor: Erik A. Olsson, Rotfluhstrasse 15, CH-8702 Zollikon/ZH, Switzerland

[21] Appl. No.: 177,437

[22] Filed: Aug. 12, 1980

Related U.S. Application Data

[63] Continuation of Ser. No. 912,479, Jun. 5, 1978, abandoned.

[30] Foreign Application Priority Data

Jun. 7, 1977 [CH] Switzerland ............ 6997/77

[51] Int. Cl.³ ........................................ B23K 28/02
[52] U.S. Cl. .......................... 228/143; 29/527.7; 228/176
[58] Field of Search ............ 228/143, 160, 176; 29/527.1, 527.5, 527.7; 164/461

[56] References Cited

U.S. PATENT DOCUMENTS

| | | | |
|---|---|---|---|
| 2,301,902 | 11/1942 | Merle | 164/461 |
| 3,460,235 | 8/1969 | Roberts et al. | 228/143 |
| 3,470,605 | 10/1969 | Benteler et al. | 228/143 |
| 3,542,116 | 11/1970 | Machlin | 164/461 |
| 3,755,883 | 9/1973 | Shimizu et al. | 228/143 |
| 3,971,123 | 7/1976 | Olsson | 29/527.7 |
| 4,113,166 | 9/1978 | Olsson | 228/176 X |

Primary Examiner—Gil Weidenfeld
Assistant Examiner—K. J. Ramsey
Attorney, Agent, or Firm—Parmelee, Miller, Welsh & Kratz

[57] ABSTRACT

Metal annuli formed of chill cast metal for subsequent conversion into finished products are produced between at least one pair of inner and outer rollers forming between them a roll-pass, the outer one of which is driven and the inner one, of less diameter than the open central area of the annulus being formed and eccentrically positioned in said open central area, is free turning. Provision is made for moving the axis of rotation of the annulus being formed as the overall diameter increases in such manner that the relation between place of delivery of the hot strip with respect to the winding apparatus remains constant. Preferably the annulus forming apparatus is combined with a continuous casting apparatus whereby the formation of the strip and the forming of the annulus take place at the same speed.

20 Claims, 5 Drawing Figures

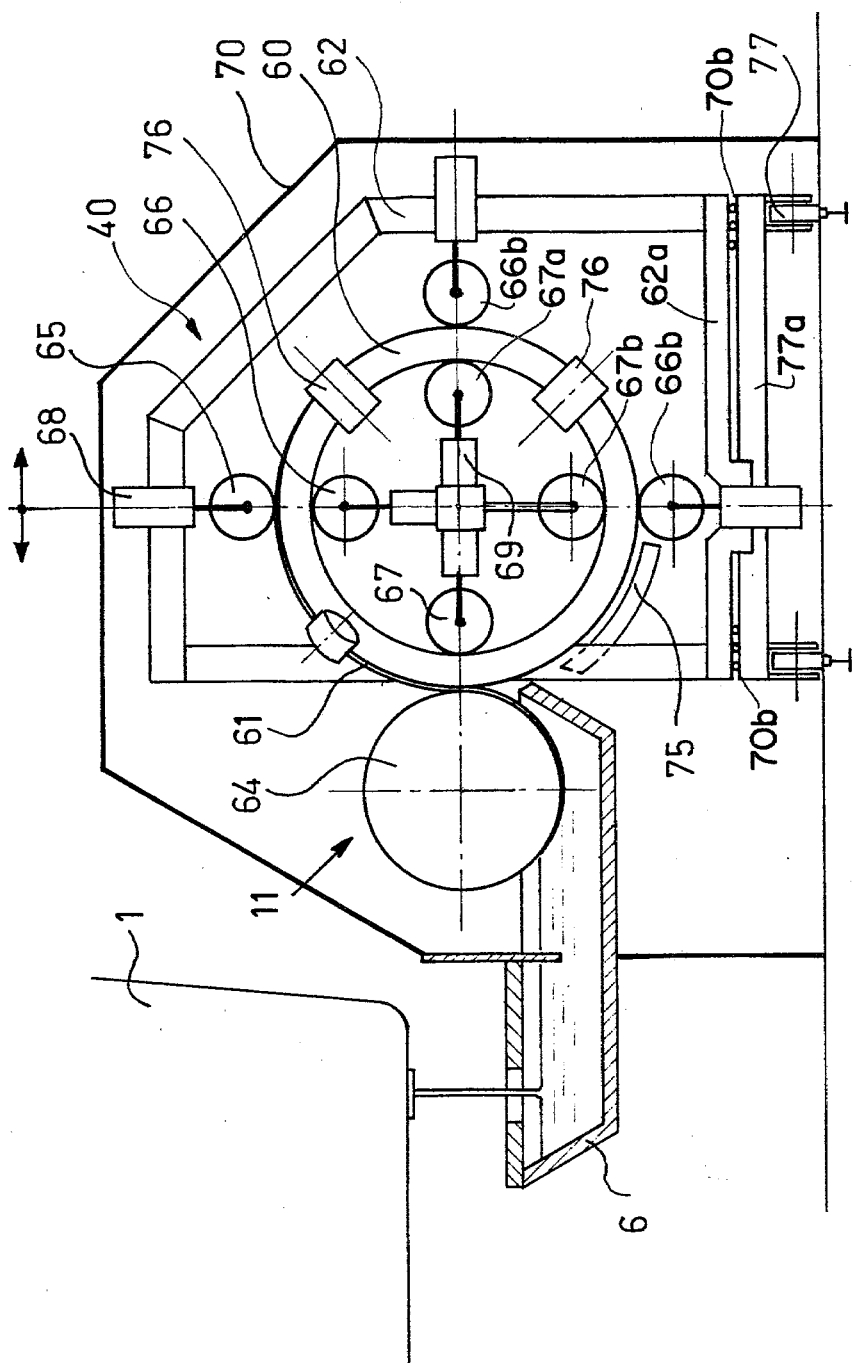

PROCESS AND APPARATUS FOR THE MANUFACTURE OF ANNULAR WORK PIECES FOR SUBSEQUENT CONVERSION INTO FINISHED PRODUCTS

This application is a continuation of my application Ser. No. 912,479 filed June 5, 1978, abandoned, and relates to the manufacture of continuously cast intermediate products in the nature of blooms or billets for subsequent conversion into seamless tubes, rings for various purposes and hoop-like products generally.

BACKGROUND OF THE INVENTION

In my prior U.S. Pat. Nos. 3,971,123 of 1976 and 4,113,166 of 1978, both of which, in so far as they are relevant, are incorporated herein by reference, I have disclosed processes for the continuous casting of metal, particularly steel and steel alloys, more economically and yielding a superior product than the conventional processes of casting the molten into ingots, or sections of large cross section.

Briefly, it is well known that when molten metal is cast in an ingot mold or continuously cast in an open-ended water cooled mold of an ingot or billet size that the grain structure and composition of the outside of the casting is superior to that which forms the core within said outside layer. This is due to the fact that the thin layer of metal first formed on the outside of the cast body solidifies very rapidly because of its contact with the inside surface of the mold, but inwardly from this outer shell, often referred to as the chill-zone, the metal solidifies at an increasingly slower rate. The slower cooling results in an increasingly coarser grain structure and a migration of alloying constituents toward the center of the section. To correct this condition, the steel, before or in the process of being converted into finished products, must be hot worked and heat treated in various ways.

In my two patents above referred to, the metal is cast into thin strands of chill zone thickness which are of fine grain structure and of substantially uniform composition throughout, having been rapidly cooled and solidified. After solidification, but preferably at a temperature where the metal is sufficiently hot that it may be pressure welded, or upon subsequent reheating to a pressure welding temperature, a multiplicity of these strands, or sections thereof, may be layered, each layer after the first being pressure welded to the preceeding one to produce a thick body for conversion by rolling, forging or other process into a finished product. Since this body of layered and integrated sections has a uniform grain structure throughout and has any alloying constituents uniformly incorporated throughout, the heat treating and hot working required of conventionally cast ingots or billets are reduced or eliminated, as are such equipment as ingot molds, blooming mills, etc.

In my two patents above identified, various casting procedures and subsequent consolidation of multiple layers are disclosed. In the earlier of said patents thin strands of metal of uniform chill zone thickness are produced on the periphery of rotating chilled rollers that dip into a body of molten metal and which I term "dip-rolls". The thin layer of metal which solidifies on the periphery of each roll is stripped as it is formed and adequately solidified and these thin strands are then consolidated under pressure while they are hot enough and in a state to be progressively pressure welded into a single integrated strand. In the other of said patents a metal belt moves continuously in contact with a pool of molten metal retained againt the surface of the belt and the cast strips so produced are layered in various ways and pressure welded to produce thick sections of metal of uniform quality.

BRIEF DESCRIPTION OF THE INVENTION

The present application for patent is directed to a process and apparatus adapting the procedures disclosed in my two patents above discussed to the manufacture of seamless tubes and rings. At the present time seamless tubes are commonly produced by hot working a section of a conventional cast ingot or billet in a piercing mill by which procedure the metal, heated to a forgoing temperature, is rolled about a mandrel to a thick tubular form which then is reheated and exstruded into a finished length of seamless tubing. In forming ring-like products, a piece of solid metal from an ingot or billet is hot forged into an annulus. Annuli so formed are heated to a working temperature and expanded radially in a ring mill. There have been modifications of these procedures and mills for doing the work.

According to the present invention annular bodies for subsequent conversion into seamless tubing or rings are produced by winding a continuously cast strand of uniform chill-zone thickness such as disclosed in my aforesaid patents into an annulus comprised of several convolutions of a strand and with the pressure welding of each convolution after the first to the underlying one to thereby produce an integrated annulus.

Preferably this procedure is accomplished comitantly with the casting of the continuous strand, with the peripheral speed of the circular body being constant notwithstanding the continuous increase in the diameter of the body and at a speed which is matched to the delivery speed of hot and easily deformed strand from the casting unit. Means for reheating a strand that has become too cool for pressure welding and integration into the body being formed may be provided.

In passing between inner and outer pressure rollers that provide between their confronting peripheries a roll-pass, a pressure welded ring of larger internal diameter than that of the inner pressure roller is formed. The outer one of these two pressure rollers is driven at a speed equal to the delivery speed of the strand to the roll-pass and it rotates the ring being formed by surface friction at the roll-pass. In this way the increase in radial thickness of the ring with each added convolution does not change the peripheral speed of the ring. Provision is also made for moving the ring and its axis of rotation as the radial thickness of the ring increases in such manner than the position where the strip is delivered to the roll-pass does not change with the progressive opening of the roll-pass as the overall diameter of the ring increases with each added convolution.

When, in the preferred process, the ring has reached the desired size, the supply of metal to the strand casting apparatus is cut off, stopping the casting operation and the forming of the strand until formation of the next ring is started, whereas, heretofore the strand would have to be cut and the production of the strand would continue. If preferred, however, this invention contemplates that two annulus forming units may be positioned in side-by-side relation so that a switch from one winding unit to the other may be quickly made after the strand is cut.

BRIEF DESCRIPTION OF THE DRAWINGS

The invention may be more fully explained by reference to the accompanying drawings in which:

FIG. 5 is a schematic side elevation of a modified apparatus for the manufacture of annuli, particularly those of larger diameter than the apparatus shown in the preceeding figures.

DETAILED DESCRIPTION

Figure 1:
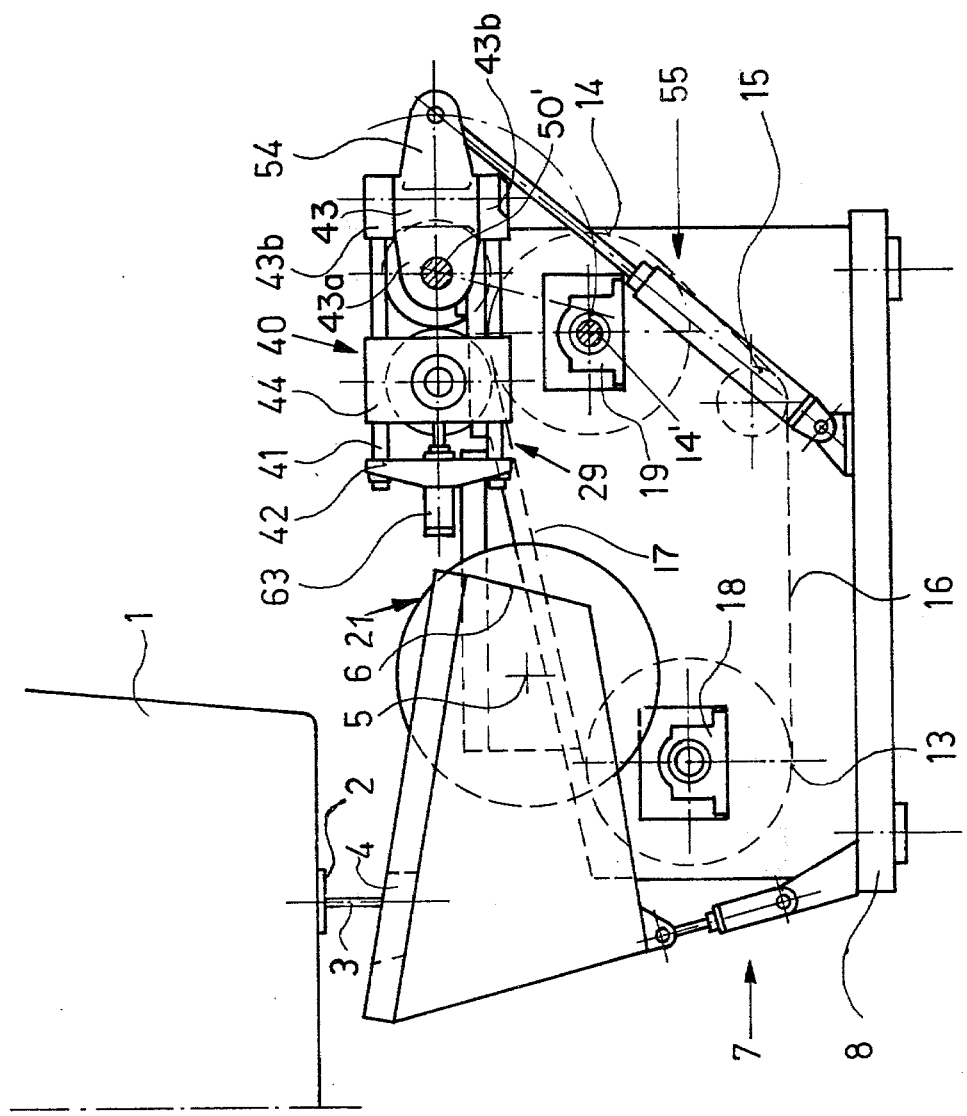
FIG. 1 is a side elevation of the ring forming apparatus but with the driving means omitted and the two power driven shafts in section.
Figure 2:
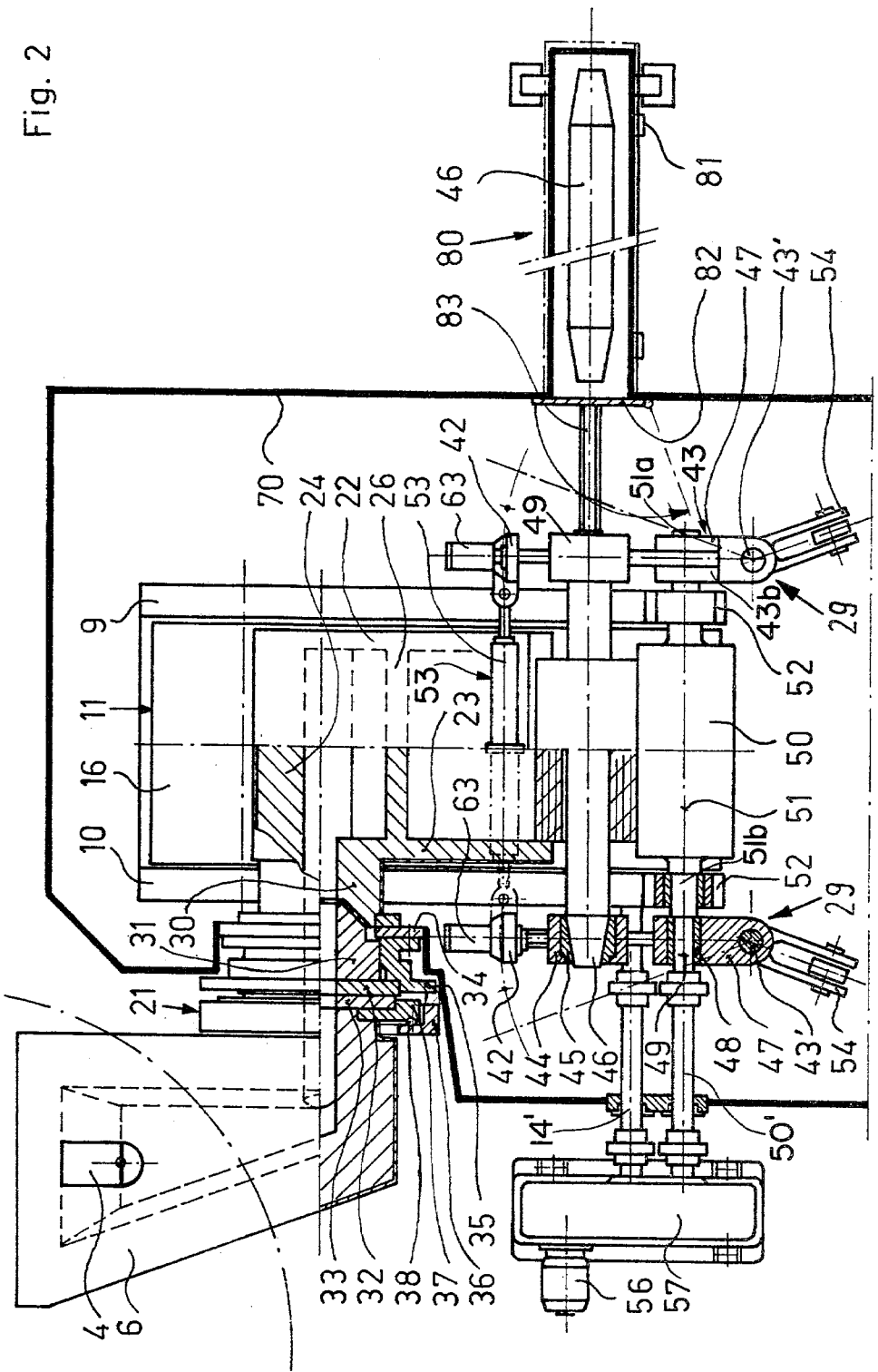
FIG. 2 is a plan view partly in horizontal section.

Referring first to the apparatus shown in FIGS. 1-4, annular work pieces or blanks for conversion into finished ring shapes or seamless tubes, etc. are manufactured directly from molten metal. The molten metal is initially received in a holding vessel 1 in the bottom of which is a discharge opening with a movable closure schematically indicated at 2 and from which the melt 3 flows through opening 4 into a refractory lined or heat insulated vessel 6 of trapezoidal shape in vertical section. This vessel may be rocked through a limited arc about an axis 5 near its narrower or shallower end. It may be regarded as corresponding in function somewhat to that of the tun-dish used in conventional continuous casting for directing molten metal from a ladle into the continuous mold of the conventional continuous casting apparatus. For rocking the vessel about the axis 5 there is a hydraulic piston and cylinder unit 7, the piston of which connects with the bottom of the vessel and the cylinder of which is connected with base 8 of a supporting frame. This base has spaced parallel side frames 9 and 10 (See FIG. 2) between which a continuous strip or strand casting device designated generally as 11 is located. As seen in FIG. 2 the melt receiving vessel 6 is to the left of the side frame 10.

As shown in FIGS. 1 to 4 the continuous casting unit comprises an endless flexible metal band or belt 16 passing around rollers 13, 14 and 15, which are supported between the side frames 9 and 10. The upper reach, 17, of this belt is inclined upwardly at a steep angle from roll 13 to 14, as indicated in the drawing, and the belt, as shown here, is driven, as hereinafter described, to travel from left to right, moving up this slope. There is a flat cooled supporting unit 12 for the belt between rolls 13 and 14. There is a melt distributor 20 contacting the upper surface of the lower end of this slope. The distributor has parallel side walls 22 and 23 located on the top edge surfaces of the belt in a position where it is above the cooler 12. The spaces between these two side walls is closed at the bottom by the continuously moving belt. The space between side walls determines the width of the strand to be cast and is narrower than the belt. The melt distributor has an end wall 24 at the lower ends of the side walls 22 and 23 with a metal inlet duct 25 thereacross and the distributor has a cover 27. Depending from the cover is a transverse baffle 26 that extends between the side walls 22 and 23 and from the cover 27 it projects downwardly, its lower edge being spaced above the endless casting belt 16. It serves to restrain slag and other floating material on the molten metal from entering the distribution.

The distributor is designed to retain a pool of metal of upwardly decreasing depth on the belt over the cooler 12 and the belt travels at a speed adjusted to solidify a thin strand of molten metal on the belt, solidification of which, of course, is accelerated by the cooler 12. The strand is continuously formed and continuously carried out of the pool at a rate such that the strand has formed before segregation of alloying constitutents of the melt can occur or crystals above those typical of the chill zone thickness of conventionally cast ingots can develop.

There is a connection assembly indicated generally as 21 through which metal flows from the vessel 6 into passage 25 of the distributor end wall 24 and is centered about the axis 5 around which vessel 6 is rocked up and drawn by the cylinder and piston unit 7. The left end of the vessel as here shown is raised to increase the flow of metal into the distributor and lowered sufficiently to keep the melt in vessel 6 to a level below this passage, and even run back from the distributor into the vessel 6 and thereby interrupt the continuity of the continuous strand after the completion of one blank or workpiece until the next strand is to be started.

Passage 25 is provided by the assembly schematically indicated at 21 in FIG. 2. It comprises a passage through the side wall of the vessel 6 concentric about the axis 5 of vessel 6 and also with the center of the passage 25 in the fixed distributor end member 24.

The wall of the vessel 6 through which this passage extends carries a ring gasket 33 on its outer face. There is a ball bearing ring 38 in the recessed face of which the gasket 33 is partially received. There is a surrounding bearing ring 35 with bearings in the race between rings 35 and 38. This gasket, 33 confronts and bears against a gasket ring 32 on the outer end of a molded body 31, the left end of which, as shown in FIG. 2, has a taper to fit into the conical socket in the end of extension 30 on distributor side-wall 23 and end-wall 24. The gasket 32 is partially received in the recess of a metal ring 35. There is a second ring 34' around the right end face of ring 34 to confine 34 and 35 in place.

Also while not shown in the drawing, means for obtaining smooth edges and preventing liquid metal to penetrate into airgaps between distributor walls and the travelling chill wall as described in my U.S. Pat. No. 3,976,117 of 1976 may be used. Also when narrow strips are converted to narrow rings, the strips may be cut out of a wider strip and wound to individual rings either side by side in a common apparatus or in individual apparatuses in a staggered relation to each other, or, as demonstrated in my above mentioned U.S. Pat. No. 4,113,166, bent over to get piled up one over the other to form a single ring. In these cases the distance between the casting and winding devices may be so large and therefore the heat losses so big, that a rapid heating of the strips may be necessary prior to winding and pressure welding.

The rolls 13, 14 and 15 are carried on shafts supported in bearings of the pillow-block or other conventional or preferred type mounted on the side frames 9 and 10, as indicated in FIG. 1 at 18 and 19, the similar bearing for roll 15 being omitted for clarity of illustration. The shaft, 14' for roll 14 is shown in section because it extends further from the frame to a driving mechanism, hereinafter more fully described.

At the rear or left face of the end wall 24 (See FIG. 4) there is schematically indicated a feeder 28 for applying a release agent to the outer surface of the metal band or belt 16 to facilitate the stripping of the cast strand from the band as it approaches the top center of the roll 14.

Figure 4:
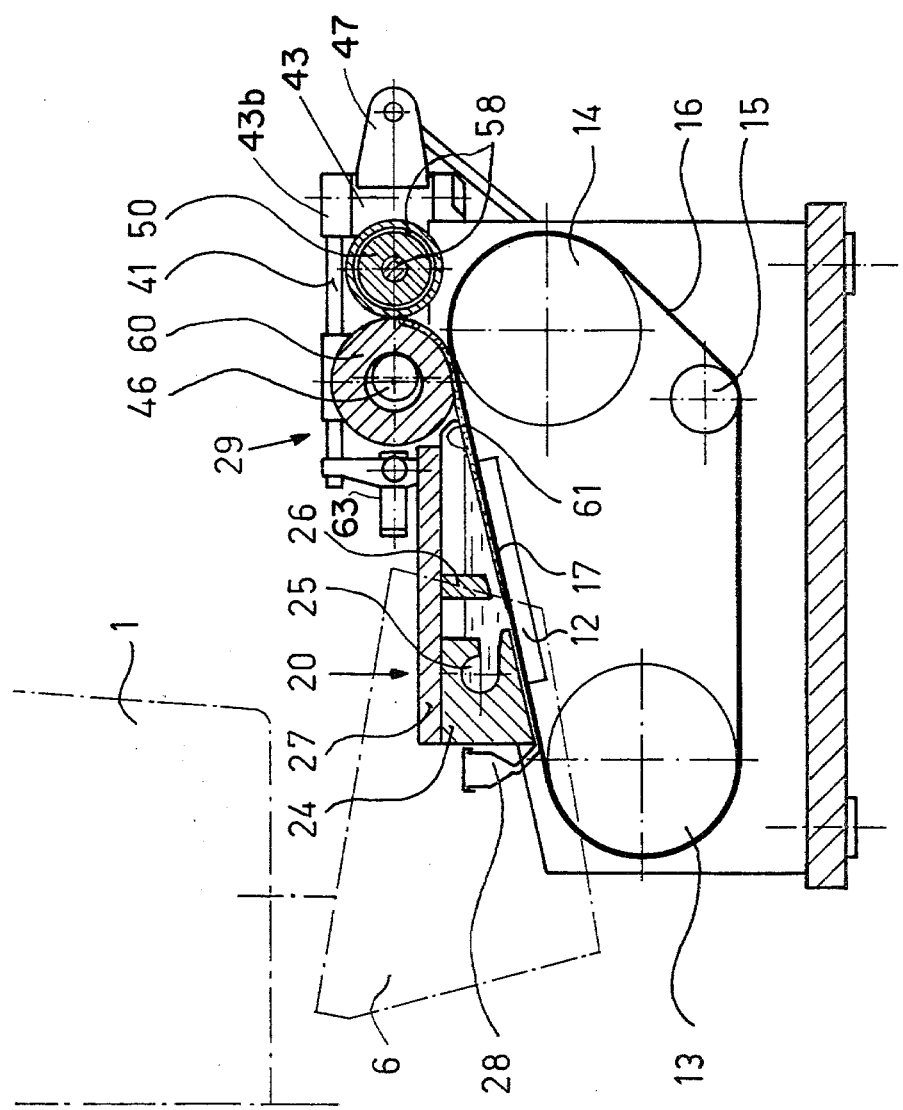
FIG. 4 is a longitudinal vertical section generally in the plane of line IV—IV of FIG. 2 and with certain parts not visible in the section being shown in phantom by broken lines.

As the casting approaches the top center roll 14, it is stripped from the belt by stripping means known to the art and as indicated for example in my U.S. Pat. No. 3,971,123, but for clarity of illustration such apparatus is not here shown. This stripping means deflects the strand upwardly. As shown in FIG. 4 there is a roller 50 above and to the right of the top center of the roll 14. The axis of this roller is indicated by broken line 51 (See FIG. 2) and it has shaft extensions 51a and 51b at opposite ends that are received in and pass through bearing blocks 52, one of which is fixed to the top of side frame 9 and the other to the top of side frame 10.

On each of these shaft extensions are similar unitary blocks 43 (See FIGS. 1 and 3) having integral portions 43a through one of which the shaft extension 51a is rotatably passed and the other of which shaft extension 51b is rotably passed. Opposite the extension 43a of each block is a clevis like extension 54 each pivoted about a vertical pin 43' to which the free end of the piston of a fluid pressure piston and cylinder unit 55 is attached, the cylinder of each unit being pivotaly attached to the base 8.

There is an integral sleeve like portion 43b at the top and bottom of each block 43 about midway between the extension 43' the clevis extension 54. There is an upper and a lower pair of parallel rods, 41 secured to these sleeve portions of each block. These rods extend a distance beyond the axis of the roller 50 toward the left as viewed in FIGS. 1 and 2 and the ends of each pair are connected by a vertical yoke 42 (See FIG. 1) and the yokes of each pair are cross connected by an adjustable cross-link 53 with a hydraulic cylinder unit 53', hereinafter sometimes referred to as a spreader link.

There is a bearing block 44 slidable along each of the two pairs of rods while hydraulic unit 63, on the fixed yoke 42 for each pair of rods is arranged to simultaneous apply pressure to these hearing blocks, urging them toward the roll 50. The bearing blocks are arranged to receive a mandrel roller 46, of smaller diameter than roll 50 and the spreader link 53 may be operated to spread the two frames formed by blocks 43, rods 41 and yokes 42 away from each other to release a mandrel 46 and drawn together to retain it. Further reference will be made to this operation.

As indicated in FIG. 4, the open space 58 in roller 50 may be water cooled as explained in my U.S. Pat. No. 3,971,123, and as shown in this figure. Where a circular integrated body 60 has been almost completely formed, the roller 46 is of smaller diameter than the roller 50 and is less diameter than the open center of the ring 60 being formed.

Finally, there is a driving motor 56 and gear box 57, (See FIG. 2) at one side of the machine which rotates shaft 14' for the endless belt driving roll 14 and also shaft extension 51a for driving roller 50. Thus the speed of the roller 50 always bears a fixed relation to the speed at which the continuously cast strand is produced on the belt 16. This avoids stretching of the hot strip in the consolidation of the circular body by what may be termed a winding operation or the buckling of the strip by the strip being supplied too fast to the winding roll 50.

In the process of forming the ring (see FIG. 4) the cast strand as it is stripped from the casting unit is directed upwardly into the roll-pass formed between driven roller 50 and the periphery of the mandrel roller 46, which is not driven. Since 50 is larger and power driven, it tends to curl the strand counter-clockwise as seen in FIG. 4 about the mandrel 46. The initial ring will be completed as the free end of the first convolution and the beginning of the second convolution pass between rolls 46 and 50. Pressure welding begins with forming of the second convolution and each one thereafter. However, the inside diameter of the annulus will always be larger than the diameter of mandrel 46, even if the beginning of winding the strip would envelope the mandrel lightly because the pressure always causes an elongation of the metal strips, i.e. the circumference of the former ring. This mandrel or inner roller, being carried in the bearing blocks 44 is yieldably urged at a predetermined pressure by the cylinder-piston units 63 against the first convolution to effect pressure welding of the second convolution as it moves through the roll-pass. This operation of progressively pressure welding the hot strand before it has cooled below a pressure welding temperature is continued, one convolution after another. As the radial thickness of the ring increases with each added convolution the mandrel roller 46, overcoming the pressure of the units 63 on the mandrel bearing blocks 43 move to the left as viewed in FIG. 4, while continuing however to apply pressure against the inside surface of the ring at the line of centers of the rollers 50 and 46. Also the axis of 46 remains eccentric to the axis of rotation of the ring 60 then under formation. Since the driven roller 50 bears against the periphery of the workpiece to rotate the workpiece, the peripheral speed of the work piece does not increase as the diameter of the work piece or ring increases, as it would if the inner roll 46 rotated the work piece. Hence the cast strand moves into the bight or pass between rollers 50 and 46 at a constant speed which is set to match the constant linear speed at which the strand is cast. In FIG. 4 the cross hatching indicates the conversion of the strand into the solid body of the ring 60 as the strand enters the roll-pass between the workpiece being formed and the driving roller 50.

Since the inner mandrel is a pressure roller of smaller diameter than the opening in the workpiece and the workpiece is not wound on the mandrel or inner roller, circular products of different internal diameter may be formed on the same machine.

As the ring about reaches the desired over-all diameter, the hydraulic piston unit 7 is operated to drop the left end of vessel 6 to stop the flow of hot metal into the distributor and even return some of the metal in the distribution to the vessel, thus bringing the strand to a tapering end, and the operation of the casting machine is not stopped until the end of the strand clears the roll-pass.

Figure 3:
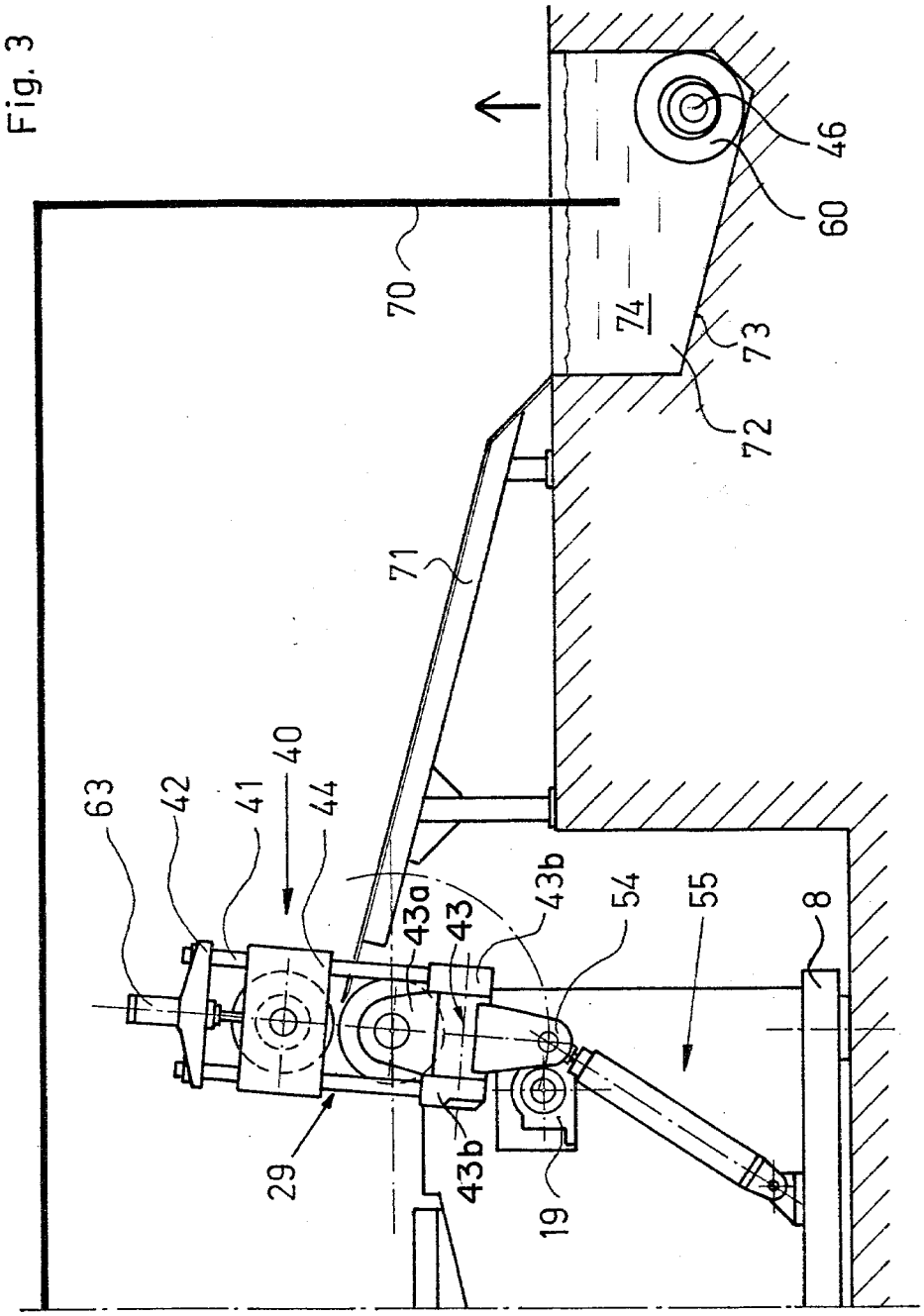
FIG. 3 shows the right end of the apparatus of FIG. 1 with the forming roll structure raised into position to discharge a finished annulus and its inner roller, the air excluding enclosure for the apparatus also being indicated.

When the formation of the solid, non-laminar ring has thus been completed, hydraulic units 55 are operated to exert a pull on their respective clevises 54, rotating the end blocks in a vertical arc, thereby raising the whole strip consolidating frame structure comprising rods 41, yokes 42, cylinder units 63 and cross link 53 about the axis of roll 50 to the vertical position shown in FIG. 3. Having been thus raised, the extension link 53 is energized to move the right frame toward the right as viewed in FIG. 2, releasing the mandrel roller 46 about which the annulus 60 has been formed to drop the annulus 60 and the mandrel onto the upper end of inclined ramp 72. (See FIG. 3). Together they roll down this ramp into a water-seal or other liquid containing trough 74. This trough has an outwardly sloped bottom 73 and at the lower, deeper side, the annulus and roller may be removed without admitting air to the enclosure 70 (FIGS. 2 and 3) and thus preserve a non-oxidizing atmosphere around the continuous casting and annulus forming unit.

After discharge of a completed annuluar body or completed workpiece, the cylinders 55 are operated to return the winding and consolidating frame to the original position shown in FIGS. 1 and 4, whereupon a closure 83 (FIG. 2) in the wall of the enclosure is opened and another mandrel roller 46 is pushed from magazine 80–81 along track 83 inside the casing through the right bearing block 44 (FIG. 2) into the bearing 45 of the left bearing block 44. This is done only after the adjustable connection or spreader link 53 has been operated to pull the side frames together for the repeat of the annulus forming operation. The insertion of the mandrel in this manner is made possible by the use of a rod or poker, not shown, inserted through an opening in the magazine. After the replacement is effected, the poker is withdrawn and the closure 83 is returned to closed position.

FIG. 5 shows an embodiment of the invention which may be used where large diameter circular work pieces are to be produced. In this view, reference numerals corresponding to reference numerals in FIGS. 1 to 4 designate corresponding parts. The numeral 1 is the hot metal supply vessel, 6 the vessel of the continuous casting apparatus and 11 designates generally the continuous strip casting apparatus which corresponds functionally to the distributor 11 of FIGS. 1 to 4.

There is a carriage structure 77a on wheels 77 within the enclosure 70, the carriage being movable in a direction normal to plane of the drawing. On the carriage there is a cage or frame 62 having a base 62a supported on the carriage structure 70a for limited movement in right and left direction 5 as indicated by the roller bearings 70b and the double pointed arrow at the top of the figure.

The casting unit 11 is of the type with a dip-roll 64 as shown in detail in my U.S. Pat. No. 3,971,123 on the surface of which molten metal in the vessel 6 rapidly solidifies to form a continuous strand which is stripped from the roll and transferred to the winding and integrating ring-forming device mounted on the cage structure 62. The ring-forming means comprises an outer roller 65 at the top of the cage which is at the end of a piston yieldably urged downwardly by a hydraulic cylinder 68. Means of a known type and not shown is provided to drive the roller 65 at a selected constant speed.

There is a support structure or hub 69 on the cage on which is means for supporting a radically adjustable inner roller 66, the center of which is in line with the center of the roller 65 and the peripheries of these two rollers 65 and 66 form between them a roll-pass. Support 69 also carries a roller 67 opposite the dip-roller 64, and the strand that is formed on the dip roller 64 is transferred to the winding unit between rollers 64 and 67. On the support 69 are two other inner rollers, 67a and 67b, the first of which is 67a, diametrically opposite roller 67 which may be radially adjustable, as is roller 67. The last of these inside-rollers 67b is diametrically opposite the top roller 66. Roller 67a may be opposed by an outer roller 66a that may or may not be a driven roller. Roller 67b is not shown as an adjustable roller, only to indicate that if the mill is to form annuli of a fixed inside dimension, no adjustment of the inner rollers is required, but it could also be radially adjustable. Roller 67b is opposed by an outer roller 66b, which also may or may not be a driven roller.

In this form of the machine the inner rollers form the inside opening in the annulus. Consequently having been set to the inside diameter of the work piece they need not be then adjusted and this too is indicated by showing the roller 67b on a radial support of fixed length no radial adjustment being indicated. Roller 65b however, like rollers 65 and 65a must move radially away from the center of the ring as the radial thickness of the ring increases but also maintain a yieldable pressure against each new convolution that is added to the ring. Guiding rollers 76 bear against the sides of the annulus being formed to assure that each successive convolution will fully and properly overly the one beneath.

In the operation of this embodiment of the machine, the continuously formed strip or cast strand of chill zone thickness is stripped from the periphery of roll 64 by stripping means of known construction. At this time the partially formed ring 60 shown in FIG. 5 does not exist and the cage 62 is shifted in the frame 77a until roller 67 forms with the casting roll 64 a roll pass between the two. The beginning of the strand curves around into the then closed, or nearly closed pass between outer driven roller 65 and the confronting inner free running roller 66. From there the strip, now curved to the proper radium feeds between the other two sets of opposed inner and outer rollers to the starting point. In so doing it passes close to curved heat exchanger 75 which may either cool the metal, or which may heat the strand or raise its temperature as may be experimentally determined to be desirable.

After the first convolution has been completed succeeding convolutions will be added and pressure welded, as in FIGS. 1 to 4. As the radial thickness of the ring increases, the cage 62 is forced radially toward the right in FIG. 5 away from the dip-roll 64 and pressure roller 65 is yieldably forced radially away from its cooperating inner roller 66 to effect immediate pressure welding of the feed strip strip to the underlying surface of the ring. Whether the strand forming unit supplies the hot strip directly to the ring winding and integrating unit or the two are separated and the strand reheated to a pressure welding temperature, the speed at which roller 65 is driven will be set to drive the ring being formed at a speed matched to the speed of the delivery of the hot strand to the ring forming roll pass 65–66.

In this modification the outer roller 65 corresponding in function to the outer roller 50 of FIG. 1 rotates the ring being formed by pressure contact with the outer periphery of the ring, thus rotating the ring being formed at a constant speed notwithstanding the radial increase in thickness of the ring. Whereas, if the ring were rotated by a driven inner roller the angular velocity of the periphery of the ring would constantly increase. In either form of the machine, the outer roller frictionally rotates the casting being formed, one roller must be movable under pressure away from the other to progressively widen the roll-pass, and the axis of rotation of the inner roller of the pressure welding roll-pass must be eccentric to the axis of rotation of the ring but supported for movement in such manner that the axis of rotation of the ring and is support can move radially away from the point of delivery of the strand to the ring forming unit in such manner that it does not change as the overall diameter of the ring being cast increases. In other words, in FIGS. 1–4, the blocks 44 move away from roll 50 to widen the roll-pass as the diameter of the annulus increases but the relation of the place of contact of the feed strip with the roll 50 does not change. So, too, in FIG. 5 the cage 62 moves crosswise of the carriage as the diameter of the annulus increases but the place of transfer of the strip from the dip-roll to the annulus which is being formed remains constant.

If the melt holding vessel 6 is not movable by lowering it away from the dip roll, in the manner shown in FIG. 1, flow of metal from ladle 7 into vessel 6 may be arrsted and the liquid removed by ending off the strand with a "tail" of diminishing thickness. Side rolls 76 are provided to keep the sides of the ring square as the layers build it toward final thickness.

When the ring has been finished, the carriage 77–71' is moved away from its alignment with the dip roll, the pressure is eased on the several pairs of inner and outer rollers and the side rollers are removed in any well known manner to allow the ring to drop from the cage or frame 62 into a ramp similar to that shown, for example, in FIG. 3.

There may be other operations or continuous strand forming apparatus where it is more practical to rotate the winding and consolidating unit in the reverse direction, that is counter-clockwise instead of clockwise as shown in FIG. 4. In this case, the winding device may be faced in the reverse direction with respect to FIG. 4 but otherwise it functions the same.

With the described installations, a work piece with desired layers of material can also be manufactured in one operation, e.g. rings or rolls with wear-resistant inner or outer layers, or tube blanks with ordinary tube steel with an inner and outer layer of stainless steel. The predetermined length of metal strands of different compositions, are lined up in sequence according to the desired stratification, and then wound up and fused in the desired direction. Of course, and as indicated, preformed strands of metal of the desired quality may be reheated and pressure welded instread of being simultaneously cast and integrated as herein shown, but in this instance much of the advantage of continuous casting and energy saving by conserving heat is lost, but the winding of the strip after heating to pressure welding temperature must be at a constant rate and co-related to the rate of reheating.

Except for the heating of the surfaces of the layers of the metal strip to be put on top of one another up to the fusion temperature, a heating of them before the winding and fusion can be useful or even necessary, especially with metals with a high heat-conducting capacity and with increased strip thicknesses. Not only would the heat be removed all too quickly from the surfaces to be welded into the inside of the roll, which would cause poor fusion as a result, but there could also be the formation of cracks. In such cases a pre-heating is suitable, e.g. a molten bath pool of salt, which if necessary would also free the surface of the strand from impurities and oxides, and which would be located in advance of the winding device 40.

The invention eliminates the requirement for any solder or other film to be applied to the strip as sometimes has been proposed. The bond, if not fully effected by pressure welding is then completed by an intercrystalline diffusion in the solid phase provided that there is a close contact between the surfaces, and a sufficiently high temperature is present. Since the diffusion is made more difficult as a result of the presence of gas film adhering to the surface, welding under a vacuum would be better, however generally with normal rolling or forging temperature, an appropriate extrusion pressure will be sufficient to achieve a good fusion. Moreover, most metallic materials cannot undergo any noteworthy deformation caused by pressure in the vicinity of the melting point without the formation of cracks in the structure, and consequently the pressure is to be adapted to the available plasticity. If the working piece is to have different properties according to the various layers, and thus is manufactured out of different materials, if necessary, excessive diffusion of one material into the other is not desirable. In this case, the fusion is done at a relatively low temperature, but at a higher pressure.

Fusion by means of intercrystalline diffusion in the solid form with the appropriate pressure is a process which requires a certain amount of time for its performance. The higher the temperature and the pressure, the shorter the time required. It must be borne in mind, especially with unreactive metals and metal alloys, that at the prevailing temperature and with the available pressure, the complete fusion may not have ended within the winding time, but a longer curing time at higher temperature and/or another hot work may be necessary, which will give a more completely adequate molecular migration. However, care in such cases must be taken that the heat is below that at which unwanted crystal growth results. With an annulus of sufficiently large diameter, not only can the required pressure for the extrusion of the just-wound layers be achieved, but also the completion of the fusion process and the material flux in the deeper layers which it requires. Should some undesired crystal growth take place, the heated ring may be immediately hot worked into a finished or semifinished final product.

As an alternative to interrupting the continuity of the casting by moving the vessel 6 vertically, two winding mechanisms may be alternatively used, in which case the continuous strand is cut at the appropriate time and the winding operation quickly switched to the second winding unit to receive and process the strand following the cut as the last of the previous length is formed into the body being first formed. By the time the piece nears completion on the second winding unit, the first winding unit may be ready to start a third annulus, etc. alternating from one winding unit to the other. In the waiting time between the units are occupied by the winding operation. They may continue to roll the annulus in order to complete the metallic bond between the layers and/or obtaining desired shape and size.

If, on account of an extended distance between the casting device 11 and the winding device 40, or on account of a time lapse, the metal strand 61 loses too much heat, a device for the rapid heating of the contact surfaces is to be used, as hereinbefore pointed out. Also, provision may be made for cooling a strand that is too hot and soft. It is important for the installation described that the metal strip produced by rolling or continuous casting reaches the winding device 40 at the desired temperature. In addition to the devices mentioned for increasing the temperature of the strip, means can also be provided for cooling it, e.g. fluids or gases. In FIG.

5 the element 75 schematically indicates means for heating or cooling the surface of the annulus to which the next new layer of strip will be applied.

The working piece 60 produced on the installations described can also advantageously be used as semi-finished products for rolling plates, strips, bars, wires, etc. as well as for extrusion and forging. If rings are manufactured from a very thin strand, a high rate of production with economical conversion costs from the melt to the semifinished product can be achieved, on account of the low investment costs required for the apparatus herein disclosed and its installation.

If, on account, of a great distance between the casting device 11 and the winding device 40, the metal strip 61 loses too much heat, a device for the rapid heating of the contact surfaces is to be used, as was mentioned above. With the use of several interchangeably used winding devices, the device which contains a final-wound working piece can possibly be operated further without causing any disturbance, e.g. with an increased rolling pressure for the completion of the fusion process which has not been completed during the winding.

In the space enclosed by the housing 70, if necessary other operations can be performed in connection with the winding. The working piece 60 can, for example, be released from the mandrel roll at a stopping point along the inclined track 71, in order to be treated with rolling, extrusion or forging equipment, but it can also be retained inside the heating furnace formed by the enclosed space for an extended period. Under certain conditions, it is then better not to pull the mandrel rolls 46 used in alternating operation out of the space or into the space, but to bring them, after they are pushed out of the working piece 60, onto a return-transport track which is located alongside the winding device 40 and which leads to the winding device 40, and which simultaneously serves as a storage place and a cooling installation for the mandrel rolls 46. The reinsertion of the mandrels 46 into the winding device 40 can be accomplished by means of rods which are introduced through the housing 70 in a gas-tight manner, and are pneumatically or electrically operated.

It is further contemplated that annulli continuously cast in this manner because of their uniformity of composition and grain structure may be cut radially and straightened into a single ingot, or billets, or cut diametrically to form two sections or otherwise cut to form two or more ingot sections for rolling, forging or extrusion into finished production.

I claim:

1. Apparatus for the production of annular work pieces for conversion into seamless rings and tubes by winding a continuous metal strip into an annulus about an axis of rotation and after the completion of the first complete convolution is formed into an open center circulate form, pressure welding each succeeding convolution to the previous one, said apparatus comprising:
    a. A pair of parallel rollers having their respective peripheries in confronting relation which provide between them a roll-pass, one of said rollers being an outer roller which is arranged to bear on the periphery of the annulus being formed, the second roller being an inner roller that bears against the inner fare of the annulus being formed, the inner roller being smaller in diameter than the inside diameter of the annulus being formed, the outer roller being a driven roller, and the inner one being turned with the successively decreased speed that the inner surface of the annulus gets during the winding at constant strip delivery speed and having its axis of rotation eccentric to the axis about which the circular body being formed rotates;
    b. One of said rollers being arranged to yieldably apply pressure to metal moving through the roll pass but simultaneously spread the opening of the roll pass as the radial thickness of the annulus being formed increases with each successive convolution of metal thereto.
    c. Means arranged to deliver a continuous strip of metal heated to a temperature to effect pressure welding in the roll pass of each successive convolution to the preceeding one.

2. Apparatus as defined in claim 1 wherein said means for delivering the continuous strip to the roll-pass is a continuous strip casting unit for forming a cast strip of chill zone thickness and delivering it while still hot to the roll pass.

3. The apparatus defined in claim 2 wherein the strip delivering means comprises a continuous strip casting unit operating concomitantly with the winding of the strip in successive convolutions.

4. Apparatus as defined in claim 2 in which the outer driven roller is operated at a speed to accept the metal at the roll-pass concomitantly with the speed at which the strip is delivered to the roll pass.

5. The apparatus defined in claim 4 in which the means to rotate the work piece comprises a power drive for the outer roller.

6. Apparatus as defined in claim 1 in which the inner roller is yieldingly urged toward the outer one and the driven outer one is carried in fixed bearing means to resist movement radially with respect to the work piece.

7. The apparatus defined in claim 6 in which the strip casting unit and the outer roller have a common drive whereby the speed of casting and the speed of forming and welding the workpiece are co-related to a common rate.

8. The apparatus defined in claim 7 in which the casting unit has a hot metal supply, and means for starving the supply of metal to the casting unit and thereby terminating the strip casting as the work piece reaches a selected diameter, without at the same instant stopping the strip winding operation.

9. Apparatus as defined in claim 1 in which there is a supporting frame wherein the position of the outer roller is fixed with respect to the place of delivery of the strip and to the frame, said outer roller having a shaft extension at each end, said extension being received in bearing on the frame;
    a. said apparatus also having two side assemblies, one at each side of said fixed outer roller with an end portion through which a shaft extension of the outer roller passes, said side assembly members being connected by a cross-link to maintain them in parallel spaced relation, each side assembly having a bearing which is slidable therealong toward and away from the outer roller, the ends of the inner roller being received in the respective slidable bearings, and pressure means on each side assembly at the end thereof which is remote from the outer roller arranged to yieldably urge said slidable bearings and the inner roller toward the outer roller.

10. The apparatus defined in claim 9 in which the cross-link is controllably adjustable to effect relative sidewise movement of the side assemblies toward and away from each other between an operating position where the ends of the inner roller are received in said bearing and a release position where the ends of the inner roller are free of said bearings, and the inner roller and the annular body formed thereabout drop clear of the side assembly bearings.

11. The apparatus defined in claim 10 wherein means are provided for moving the side frame assemblies in a vertical arc from an operating position upward before said assemblies are moved apart to release the inner roller, and means are arranged to receive the inner roller and the formed annulus when they drop clear of said side assembly bearings.

12. Apparatus as defined in claim 1 in which the annulus being formed is supported for movement with respect to strip delivery means in a direction so that the position of the entry to the roll-pass relative to the said strip delivery means remains relatively fixed as the readial thickness of the annulus being formed increases.

13. Apparatus as defined in claim 1 wherein the annulus being wound is arranged to shift laterally as the diameter of the annulus increases to keep the place of first contact of the strip being delivered to the surface of the annulus under formation substantially constant.

14. The apparatus defined in claim 1 having means arranged to rotate the work piece being formed at a constant peripheral speed matching the speed of delivery of the strip to the roll pass notwithstanding the progressive increase in diameter of the ring.

15. The process for manufacturing a semi-finished workpiece in the form of an annulus and primarily useful for subsequent manufacture by rolling, foregoing or extrusion operations into seamless products in the form of tubes, rings and hoops comprising:
   a. winding a continuous length of strip metal into a coreless annulus between inner and outer parallel rollers forming between them a roll-pass, the inner one of which rollers is smaller in diameter than the center opening of the annulus being formed and with its axis of rotation eccentric to the axis about which said annulus rotates, feeding said metal strip heated to a pressure welding temperature to the roll pass at the same rate that the strip moves through the roll pass to avoid stretching or buckling of the heated strip, and driving the annular body being so wound and simultaneously pressure welded at a uniform peripheral speed notwithstanding its progressive increase in diameter from start to finish.

16. The process for manufacturing a semi-finished workpiece of annular form as defined in claim 15 wherein the strip metal is continuously chill cast and delivered concomitantly with the feeding of the strip through the roll pass.

17. The process of manufacturing a semi-finished work piece of annular form as defined in claim 16 wherein the supply of molten metal for casting is termmated when the annulus reaches a predetermined thickness in a direction radially of the annulus.

18. The process defined in claim 17 wherein the operation continues until its supply of molten metal thereto completely tapers away and the strip end clears the roll-pass.

19. The process defined in claim 18 in which the molten metal supply to the casting unit is starved with the casting operation continuing by lowering the level of the molten metal supply to the casting operation while continuing the casting operation to taper off the thickness of the strip as the casting approaches a predetermined over-all radial dimension.

20. The process defined in claim 15 wherein the work piece after reaching a predetermined over all diameter is thereafter subjected to diffusion heating to further integrate the several convolutions.

* * * * *